United States Patent [19]
Rudich et al.

[11] Patent Number: 5,490,196
[45] Date of Patent: Feb. 6, 1996

[54] MULTI ENERGY SYSTEM FOR X-RAY IMAGING APPLICATIONS

[75] Inventors: Irwin Rudich, Wilton, Conn.; Tapio E. Virtanen, Espoo, Finland

[73] Assignees: Metorex International Oy, Espoo, Finland; Vista Technology, Inc., Norwalk, Conn.

[21] Appl. No.: 210,368

[22] Filed: Mar. 18, 1994

[51] Int. Cl.$^6$ .................................................. H05G 1/08
[52] U.S. Cl. .............................. 378/101; 378/92; 378/112
[58] Field of Search ............................... 378/92, 41, 101, 378/111, 114, 115, 112

[56] References Cited

U.S. PATENT DOCUMENTS

| | | | |
|---|---|---|---|
| 4,047,036 | 9/1977 | Smith et al. | 378/92 |
| 5,107,528 | 4/1992 | Asahina et al. | 378/41 |

*Primary Examiner*—David P. Porta
*Assistant Examiner*—Don Wong

[57] ABSTRACT

In an all electronic multi energy system at least two levels of x-ray energy are produced sequentially and rapidly at independently controllable and different power or flux levels. In the system there are a triode x-ray tube which selects the operating current of the system and a series connected temperature limited diode or triode which controls the voltage across the first x-ray tube. This system provides improved performance in x-ray imaging applications at low cost, for example, in baggage inspection or measurements of bone densities and medical fluoroscopy. The objective of the system is to produce a maximum amount of useful information with a minimum amount of exposure for the patient or object to be illuminated by x-ray flux. With human patients this is desirable for health safety reasons; for baggage inspection, to reduce exposure to photographic films.

9 Claims, 4 Drawing Sheets

MULTI ENERGY SYSTEM FOR X-RAY IMAGING APPLICATIONS

The invention relates to an all electronic multi energy system in which at Least two levels of x-ray energy are produced sequentially and rapidly at independently controllable and different power or flux levels.

PRIOR ART

When measuring bone densities in the human body the object is to determine whether patients are affected by a disease of the skeletal structure such as osteoporosis. In the U.S. Pat. No. 5,148,455 an x-ray densitometer is described which uses an x-ray tube switched between two different voltages in order to generate a collimated beam of two different energies. The power supply produces one high energy level pulse and one low energy level pulse because these pulses are derived from the main power line frequency of 60 Hz. One pair of pulses having one high energy level pulse and one low energy level pulse are generated every 1/60 of a second. According to the above US patent the object to illuminated by the x-ray beam, i.e. a patient, is stationary in his/her position when the bone densitometer is in operation. In this application the x-ray source and detector are moved relative to the patient. The time can be reduced for a scan and the resolution of the image improved with more accurate and reproducible density results by use of the new invention described herein.

The similar U.S. Pat. No. 5,044,002 relates to an x-ray absorptiometer which is suitable to respond to the effective atomic number of objects located within a piece of baggage to indicate objects having a given composition. The piece of baggage to be inspected is moved relative to an x-ray beam. The power supply of the apparatus is adapted to apply alternate high and low voltage levels to the x-ray source. According to one embodiment of the U.S. Pat. No. 5,044,002 the high level pulses are produced at 150 kilovolts and the low energy pulses at 75 kilovolts. The pulses are spaced such that the time between the start of one pulse and the start of the adjacent pulse of different energy is 1/120 of a second. The frequency for generating one pulse is thus the same as in the above mentioned U.S. Pat. No. 5,148,455. However, this frequency is a limitation for the better and more rapid inspection of baggage which moves continuously past the inspection device. In this case the tube is operated at a fixed filament current during the entire cycle of high and low energy output. Since the tube anode current is approximately the same for both energy pulses in U.S. Pat. Nos. 5,044,002 and 5,148,455, the high energy flux, before filtration, is at least four times the low energy flux. The need for a synchronized rotating x-ray filter to reduce the amount of high energy radiation from the x-ray tube is a limitation on the speed of this system.

Some of the advantages of "dual energy" can be obtained in bone densitometry or security systems by distorting the single peaked spectrum of energy available from an x-ray tube that has a constant potential anode supply voltage. "K edge" filters, such as samarium oxide or cerium, are used as tube exit filters to produce two unequal continuous peaks of energy. After transmission through the object being measured the transmitted beam is detected by two separate detectors partially optimized to respond respectively to high and low energies.

In general, the low energy detector responds to both high and low energies and the high energy detector has extra filtration to reduce its response to low energies, which are more easily absorbed or scattered. To the extent that the x-ray beam simultaneously carries both high and low energies, the geometric scatter of the beam as it travels through the object and the detectors reduces the resolution of the system. In those systems where the low energy detector intercepts the beam before the high energy detector this defect is exaggerated. The invention described herein eliminates these problems by alternately exposing the object to low and high energies and using only one detector or detector array for both high and low energies. Thus the electronic computing for density is facilitated and the resolution improved by the elimination or reduction of scattered x-rays and geometric and energy overlap in the image.

The object of medical digital subtraction angiography is to make visible blood vessels in the region of the heart using minimum contrast media. The active x-ray source may be a high power rotating anode diode x-ray tube used to take successive flash pictures at high and low energies. A high power triode or tetrode under grid control varies the pulsed voltage applied to the rotating anode tube. When the tube filament current does not change in the time when the tube is switched from low to high energy, excess high energy flux is generated resulting in a high signal to noise ratio. U.S. Pat. No. 4,361,901 describes the use of a gridded medical x-ray tube to reduce the current and x-ray flux during the high energy pulses. As an alternative to the series triode or tetrode a variable resistor controlled by a motor is used to adjust the voltage drop across the x-ray tube. This control is slow relative to the energy switching time, making the series resistors essentially fixed as the tube current is changed by the x-ray tube grid. This system is quite complex and and uses expensive components, according to the comments in U.S. Pat. No. 5,253,282.

In this last U.S. Pat. No. 5,253,282, the problem of excess flux at high energy in a tube with a fixed filament temperature is handled by changing the relative pulse widths at high and low energy and integrating the flux response over time. This technique is limited to those applications which can allow such integration.

The object of the new invention is to remove drawbacks of the prior art and to create a more rapid, simplified and inexpensive system to provide at least two levels of x-ray energy at independently controllable different power levels to allow faster switching of the x-ray tube currents and anode voltages, and, respectively, more accurate identification of materials in baggage or measurements of bone densities. The essential features of the new invention are described in the attached claims.

DESCRIPTION OF INVENTION

In the preferred embodiment the system consists of two x-ray tubes electrically connected in series. One of the x-ray tubes has a grid which allows the current through the x-ray tube to be varied as the grid to cathode voltage varies. This x-ray tube also generates the desired x-ray beam. The second x-ray tube has a non linear impedance characteristic that has a low impedance at the low current used with high energy x-ray output and high impedance at the high currents used a low energy outputs. As a result the gridded tube is operated in a condition such that the x-ray flux can be set at approximately equal levels at high and low energies despite the high switching speeds. Control of the filament temperature of the second tube varies the relative impedances of the two tubes and allows the adjustment of the lower energy level of the first tube.

The multi energy system of the invention is used for x-ray imaging applications in continuous operation. Therefore, this multi energy system has also the means to expose to the x-ray beam at least one object to be inspected as well as the means for detecting intensities of, analyzing and displaying radiations transmitted through the object to be inspected.

The multi energy system is advantageously used to distinguish different kinds of materials from each other. This selectivity of materials is based on the penetration of the x-rays generated by the multi energy system of the invention. This multi energy system generates both soft and hard x-rays sequentially at the x-ray tube source. Owing to the rapid generation of both soft and hard x-rays in sequence the intensities of radiations absorbed by the object to be inspected can be detected using only one detector, the same detector for both radiations. This detector system takes advantage of the ability of the x-ray tube to switch energy levels quickly. This means that the system of the invention can be operated faster and with higher resolution so that observations can be made that are not presently seen and the measurements are more accurate and reproducable when compared to using the systems of the prior art.

In the bone densitometer application where the tube head and detector assembly move with respect to the patient the detector generally consists of two scintillators and photomultipliers with K edge filters between the soft and hard scintillators. This invention reduces the need for one scintillator and the filter and the resulting scatter. The rapid exposure to alternate hard and soft x-rays offers the same resolution and speed advantages as in the security application and exposes the patient to less radiation.

In medical and industrial fluoroscopy the detector is an image intensifier tube and television camera whose output can be processed by the computer, using the knowledge of the source energy, and displayed or recorded with better density resolution. The speed of such a system is, with this invention, now limited by the ability to clear the image tube between exposure to soft and hard images which now is limited by the image tube to 30 frames per second. This is generally adequate but can be expected to improve as this invention drives the imaging technology.

In the embodiment using two x-ray tubes it is also possible to utilize two x-ray beams, one x-ray beam generated by each of the x-ray tubes. Instead of producing both soft and hard x-rays, the x-ray beam from the diode-type x-ray tube produces only soft x-rays. Therefore, it is possible to use these soft x-rays, with a delay in the image processing computer, to add to the soft x-rays from the triode-type x-ray tube when determining the response of the system to soft and hard x-rays.

It is also possible to use the system of the invention so that the feedback reference voltages are adjusted so that there are three x-ray energy levels where two energy levels are emitted from the gridded x-ray tube and one from the x-ray tube which acts as a non linear resistance.

The use of both properly located x-ray tubes as sources with different spectral output characteristics and the high possible speed of the system can also allow the system to produce three dimensional images using the two x-ray tubes and a single detector with stereoptic image analysis and display. In this embodiment the processed colored images produced alternately by low and high energy on the screen of the video monitor can be viewed through right and left colored eyeglasses to locate objects in the proper depth relationships.

When using the multi energy system of the invention for the security purposes the hard and soft radiation generated by this multi energy system of the invention can select material between metal and plastic. This happens because the hard x-rays have a good penetration into metals. Thus it is possible to separate advantageously, for instance, harmful plastic explosives even inside a metal cover. The multi energy system of the invention is then practical for detecting bombs made of plastics.

The simplicity of the invented system contributes to its potential low cost. Compared to the conventional bone densitometer or baggage inspection system that uses filtration to achieve "dual energy" there is a reduction in cost because only one detector or array is needed. Added to the cost of a conventional system is the cost of a simple non critical temperature limited diode or x-ray tube with its filament supply and control.

DESCRIPTION OF THE DRAWINGS

The invention is further described in the following drawings wherein:

In FIG. 1 a triode type x-ray tube 1 is electrically connected in series with a diode type x-ray tube 2. These x-ray tubes 1 and 2 are installed inside a tubular housing 3 filled with a liquid, solid or gel insulating material whose purpose is to remove heat and prevent high voltage breakdown. In the security application, the tube housing 3 is positioned in the neighborhood of a conveyor belt 4 where the objects to be inspected 5 are movable. Tube 2 is fed by anode current from a power supply 6. The voltage of the grid 7 in the x-ray tube 1 is switched by the drive generator and control 8. The grid to cathode voltage of tube 1 is switched by the drive voltage from zero, where the maximum tube current is determined by the emission current of both the tube 1 and tube 2. The emission currents are adjusted by the filament currents of the cathodes in both of the tubes so that the temperature of the filaments 9 are controlled. Adjusting the relative temperature (see FIG. 2) of the filaments allows the relative impedance of the two tubes to be set at the peak tube current and the division of the supply voltage to change. This is used to set the voltage across tube 1 when it is generating only soft x-rays.

Figure 1:
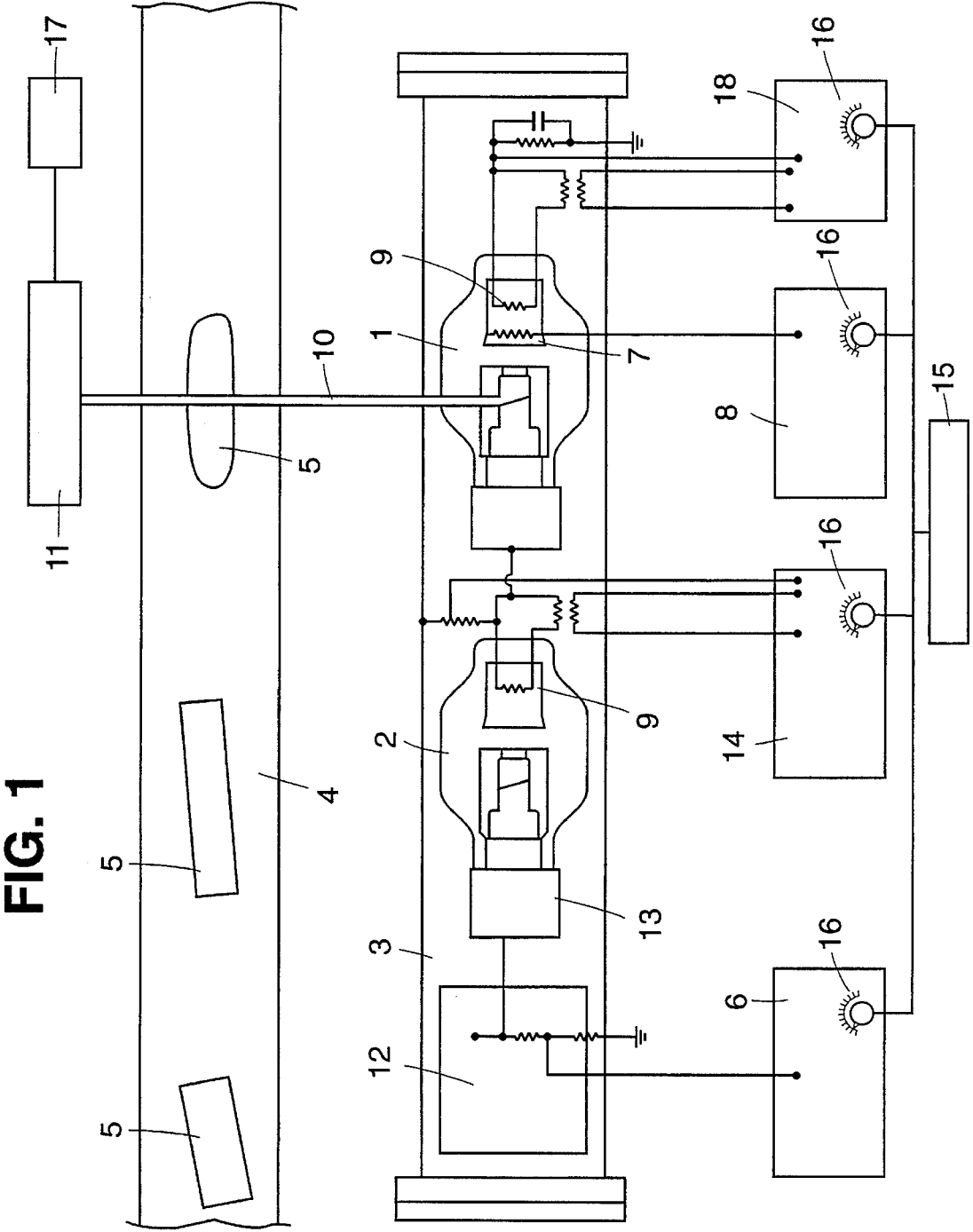
FIG. 1 illustrates one preferred embodiment of the invention by a schematic side view.

When the controlled grid drive generator drives grid 7 by negative voltage, the tube current in both the x-ray tubes 1 and 2 will be reduced. Since the impedance of the tube 1 increases the voltage across the x-ray tube 1 will increase and the voltage across the x-ray tube 2 will decrease.

The x-ray tube 1 generates the desired x-ray beam 10 which is collimated to the objects to be inspected 5 on the conveyor belt 4. Owing to the multi energy system the x-ray beam consists of alternate hard or soft x-rays depending on the grid voltage of tube 1 at that instance. The intensities of radiations transmitted through the objects to be inspected 5 are detected by the single array of detectors 11. The detector output is analyzed in the digital computer 17 with a program or algorithm that compares the amount of soft radiation flux with the quantity of hard radiation. The computer display is a precise, reproducible, accurately resolved image of the density of the object 5.

Figure 4:
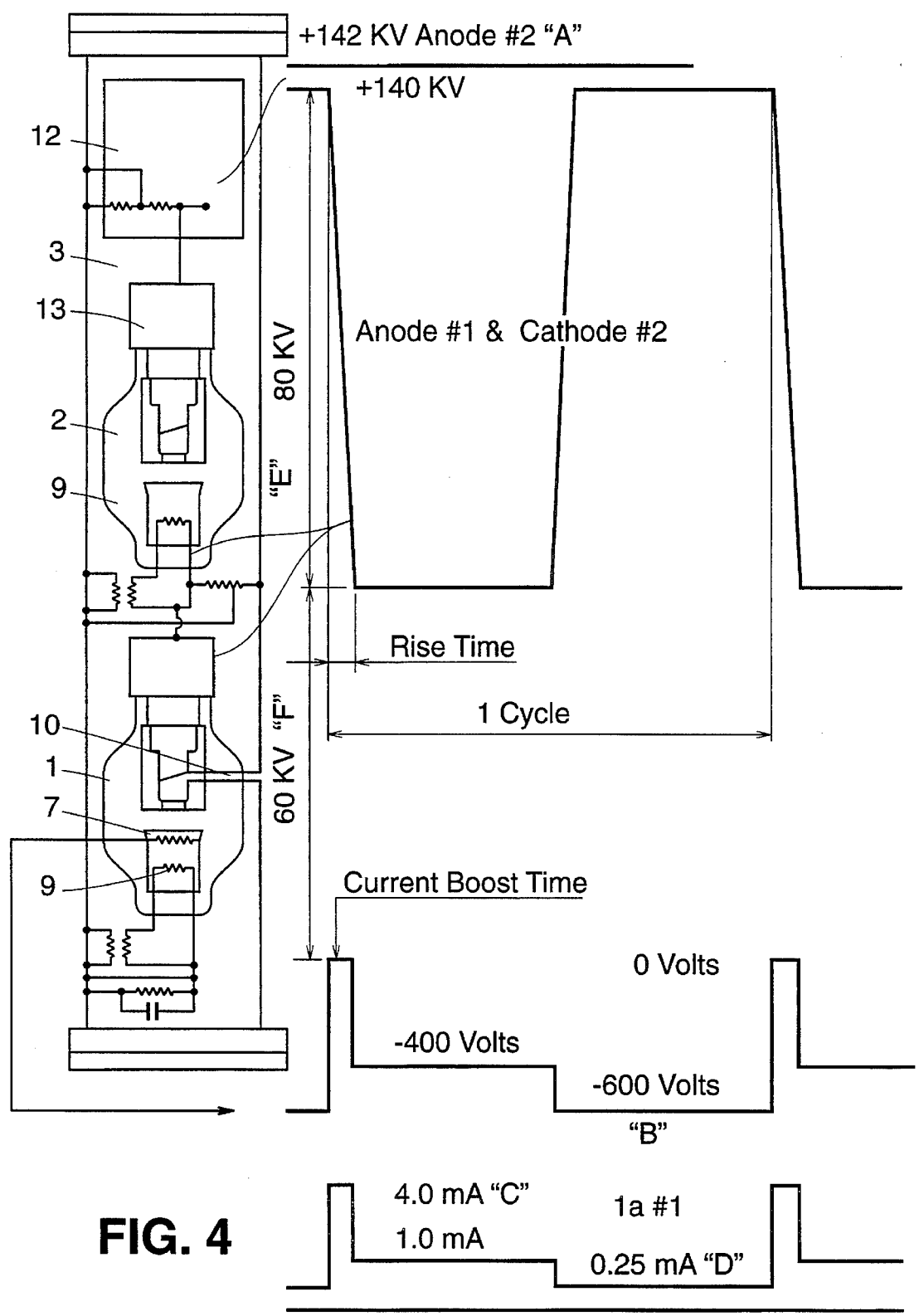
FIG. 4 shows how the embodiment of FIG. 1 can produce one cycle of high and low energy in 1,000 microseconds or at a rate of 1,000 Hz.

The schematic drawing 1 shows a unit in which the filament of tube 1 is returned to ground, and the anode of tube 2 is connected to a positive low ripple highly stable main high voltage constant potential power supply. The system can also operate with the anode of tube 2 grounded and the filament isolated at a negative high voltage. Using two floating filament supplies the system can operate with two half value high voltage supplies with the positive unit connected to the anode of tube 2 and the negative unit connected to the cathode of tube 1. The square wave grid drive voltage is always referenced to the filament of the active tube 1. Preferably the high voltage supply is a high frequency type in which the high voltage elements 12 of the supply are included in the tube head housing. Other types can be used, provided they have adequate stability and low ripple. In the embodiment shown in FIG. 1 the value of the rectified constant potential DC high voltage "A" in FIG. 4 is set and maintained by adjusting a highly accurate reference voltage in the high frequency generator and control 6. This voltage is compared to a portion of the high voltage by a high gain amplifier which controls the width of the high frequency pulses or the low voltage supplied to the generator. This feedback maintains the high voltage "A" in a exact relationship to the stable reference.

Figure 2:
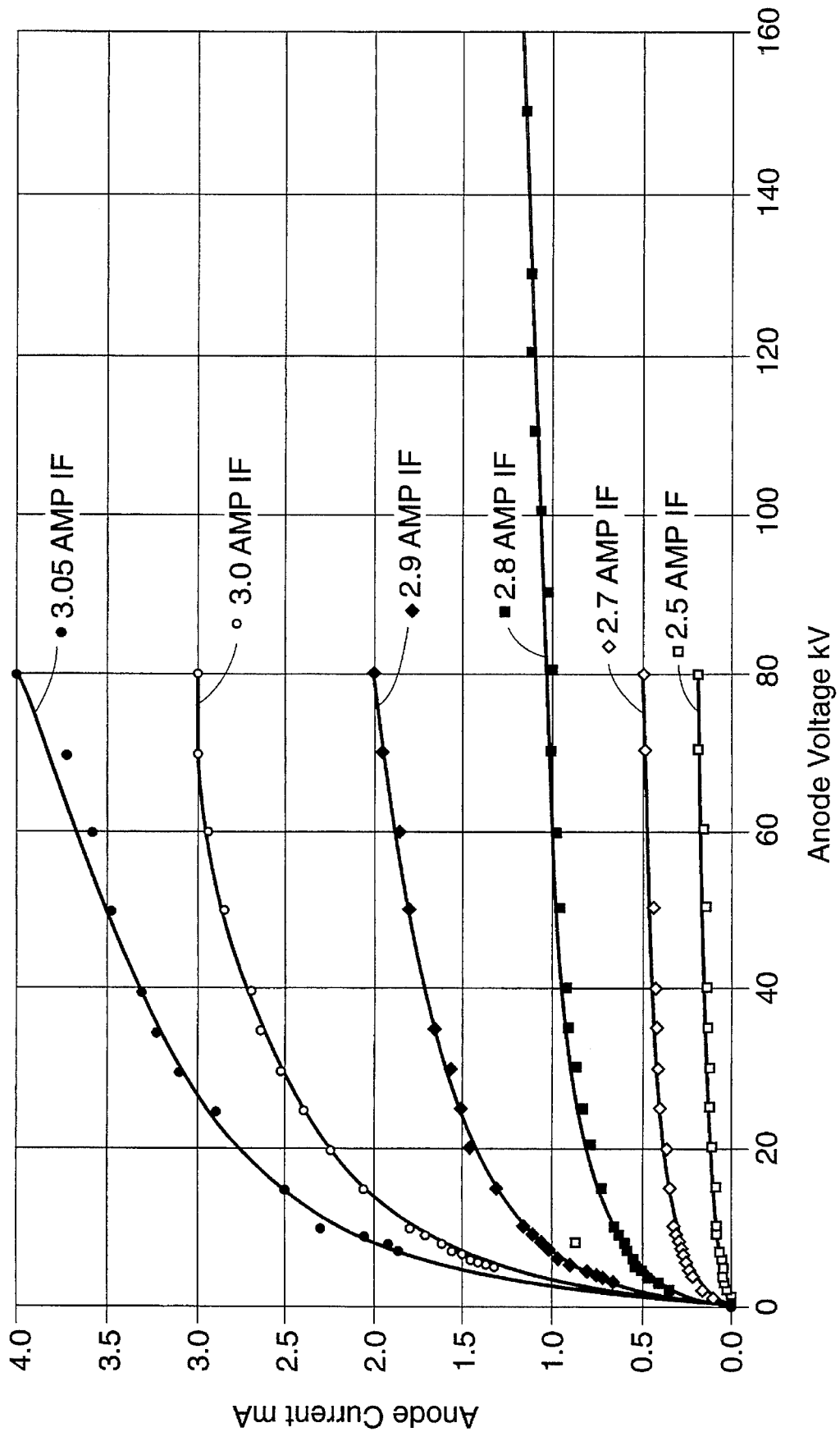
FIG. 2 illustrates the dependence between anode current and anode voltage as a function of the filament current in the series diode x-ray tube for the embodiment of FIG. 1.

FIG. 2 is a plot of the cathode emission of the x-ray tube 2 (or a triode x-ray tube with the focus cup which acts like a grid, connected to the filament insulated from the grid) as a non linear function of the anode to cathode voltage and filament current. The cathode is a tungsten filament. It should be noted that the impedance of the device increases as the tube current increases so that the voltage across the tube is not proportional to the tube current. For example, at 2.8 amperes filament current, the voltage across the tube at 0.25 mA. is approximately 2 kV. At 1 mA., four times the current, the voltage is 80 kV or 40 times the voltage at 0.25 mA. By varying the filament current it is possible to adjust the anode to cathode voltage at a particular anode current, or, alternatively, adjust the anode current at a particular anode to cathode voltage. The variation of anode current or voltage is slow and takes 0.5 to 3 seconds to stabilize when the filament current is changed because of the thermal mass of the filament. Increasing the filament current reduces the tube impedance at a particular anode current and vice versa.

Figure 3:
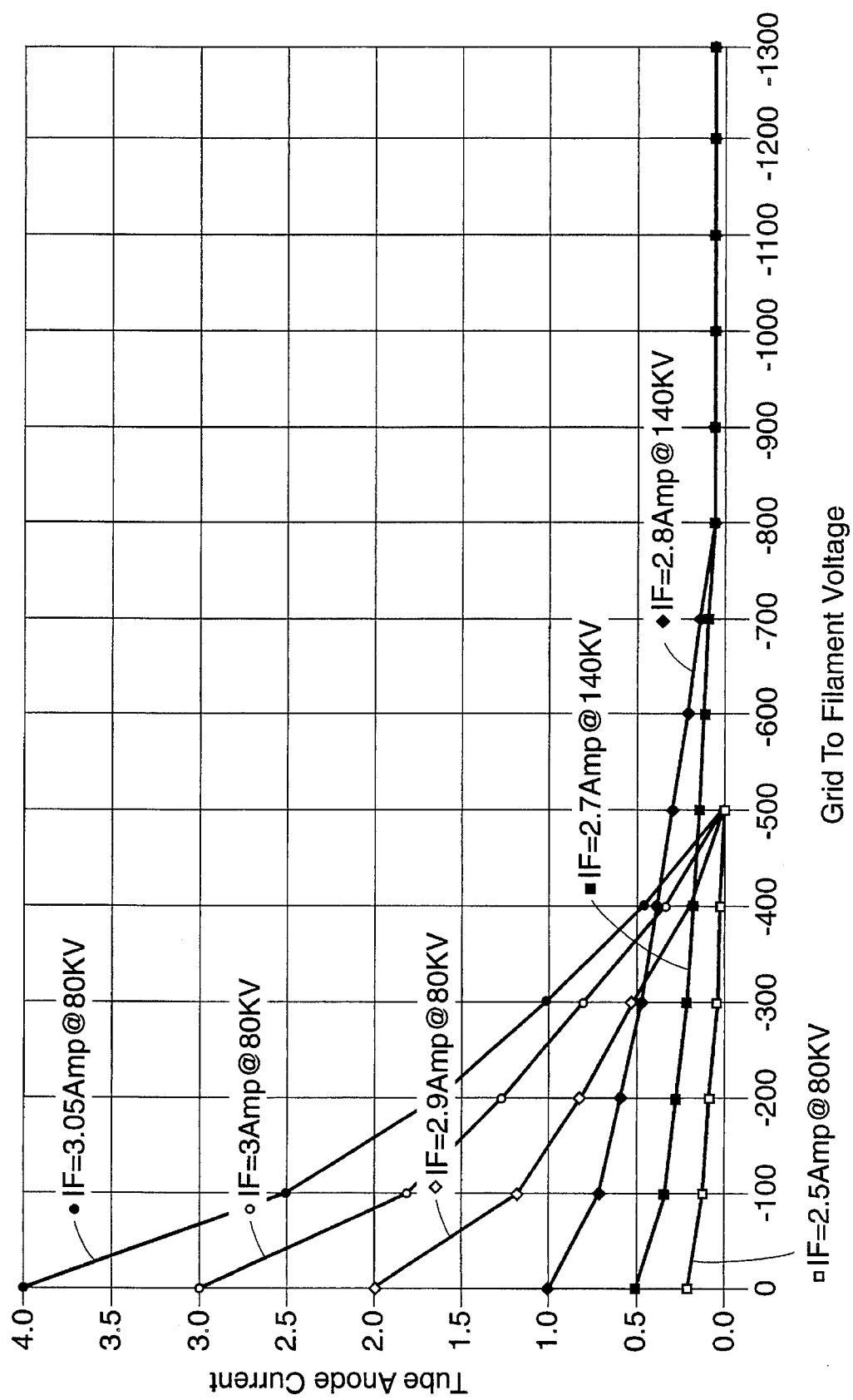
FIG. 3 illustrates the influence on the cathode current of variations in the grid voltage (bias) of the triode x-ray tube at different filament currents and two typical anode to cathode voltages.

FIG. 3 is a plot of the x-ray tube 1 in which the grid is connected to a negative direct current supply (bias). The anode current will change rapidly (within one microsecond) when the grid voltage is switched from one value to another. For example, at 80 kV and 3.05 amperes filament current, changing the grid bias from −400 to −600 volts will change the anode current from 1.0 mA to 0.25 mA in less than one microsecond. This time for switching the tube current is determined by the time required to change the charges on the low grid to filament capacitance. The invention takes advantage of the above characteristics of diode and triode X-ray tubes.

In FIG. 4 a positive high voltage power supply 12 is connected to the anode of the diode X-ray tube 2. The filament of this diode X-ray tube 2 is then connected to the anode of a gridded triode X-ray tube 1, which is then connected to ground via a small resistance. Therefore, diode 2 and triode 1 are in series, and the anode currents which flow through both tubes are identical except for capacitance charging currents during switching. In this example of the embodiment, therefore, the triode tube 1 can pass 4.0 mA at zero grid bias and a lower current of 3.05 amperes and lower currents, such as 1 mA when grid bias is applied. However, the 1.0 mA must come from the x-ray tube 2. By setting the filament current (see FIG. 1) of the x-ray tube 2 at 2.8 amperes the voltage drop across diode tube 2 is 80 kV. If the grid of tube 1 reduces the current in tube 1 to 0.25 mA the voltage drop across tube 2 becomes only 2 kV. Therefore, depending on the grid voltage of tube 1 the anode of tube 1 is either at 140 kV and 0.25 mA or 60 kV and 1.0 mA. It may be necessary to boost the current in tube 1 to 4 mA for a short time in order to accelerate the charging of the capacitance to ground at the junction of the cathode of the tube 2 and the anode of the tube 1. This shortens the time for this point to change voltage from 140 kV to 60 kV. These relationships are also shown in FIG. 4 which also shows how this embodiment can produce one cycle of high and low energy.

A scheme for accurately setting and maintaining the key current and voltage levels used in this system is outlined in FIG. 1 and is similar to the one previously described for setting the main high voltage "A" in FIG. 4. The current level "C" during the current boost portion of low energy half of the cycle is set by adjusting a reference voltage in the current control 18. An amplifier compares this voltage to the voltage across a resistor in series with the cathode of tube 1 and adjusts the filament current of tube 1 to the desired peak or average value. A setting of a reference voltage in the low energy control 14 is compared to the peak or average voltage "E" across tube 2 and the filament current of tube 2 is adjusted so that the voltage "E" is maintained at the desired value. The current "D" occurring during the high energy half of the cycle sensed by a voltage across tube 1 cathode resistor is compared with a reference voltage that controls and maintains the three values of the grid 1 voltage in control 8.

The x-ray energies and flux levels can be changed to optimize the detection or measurement of objects or materials desired by adjusting the various reference voltages under analog or digital program control as shown on 15 of FIG. 1. The reference number 16 shows the adjusting member in the respective voltage control devices 6, 8, 14 and 18. It will take several seconds to reach new conditions after a change because of the time it takes for filament temperatures to stabilize.

In FIG. 1 the detectors 11, image processing, programming and display 17 depend upon the type of application in which this multi energy system is used. In the security application, the baggage moves along a conveyer creating a horizontal scan. A vertical x-ray fan beam intercepts a vertical array of scintillator covered photodiodes which read out the vertical image information into a computer 17 for image processing and display. In this invention the detector can be a single array exposed alternately to hard and soft x-rays. The resolution is excellent because scattering is low and the image from hard and soft rays are in excellent register. Also, the objects move little between the two scans because of the high switching speed.

When more power output from x-ray tube 1 is required in order to speed up the movement of objects to be measured 5 on the belt 4, the tube current of x-ray tube 1 can be increased and the x-ray output of the x-ray tube 2 can be added to the low voltage output of the tube 1 with a delay in the detector output.

We claim:

1. A multi energy system for x-ray imaging applications wherein at least two levels of x-ray energy are produced at different power or x-ray flux levels, comprising a highly stable regulated high voltage supply, two x-ray tubes in series, one x-ray tube having a voltage driven control grid which allows rapid variation of the tube current and generating an x-ray beam, means to expose an object to be inspected to the x-ray beam, a second x-ray tube acting as a non linear resistance controlled by the temperature of its filament, said x-ray tubes electrically connected in series in order to allow the current through said x-ray tubes to vary the voltage applied to the first tube, means for detecting the intensities of x-rays transmitted through the object to be inspected and a means to set up, regulate and maintain the illuminating x-ray energy and flux levels at planned or programmed values.

2. System to claim 1, comprising two x-ray tubes of which one x-ray tube is a triode-type tube, another x-ray tube being a diode-type tube.

3. System to claim 1, comprising the two x-ray tubes are triode-type x-ray tubes.

4. System to claim 1, wherein a single detector is used for detecting of the intensities of hard and soft x-rays transmitted through the object to be inspected.

5. System to claim 1, wherein a detector array is used for detecting of the intensities of hard and soft x-rays transmitted through the object to be inspected.

6. System to claim 1, wherein the grid of a triode x-ray tube can be synchronized with the grid of the active triode x-ray tube to allow intermediate energy and x-ray flux levels between the high and low energy levels.

7. System to claim 1, wherein analog or digital programming the feedback reference voltages in the means to set up, regulate and maintain the illuminating x-ray energy and flux levels, can vary the x-ray energy levels and flux quantities to optimize the ability of the system to detect or image specific materials or object densities.

8. System to claim 1, wherein both x-ray tubes are physically separate active x-ray sources with different x-ray spectra located to allow three dimensional stereoptical viewing of the objects inspected using a single detector array or image-intensifier-camera-monitor chain and the sequential dual illuminating sources.

9. System to claim 1 or 7, wherein the feedback reference voltages in the means to set up are adjusted so that there are three x-ray energy levels where two energy levels are emitted from the gridded x-ray tube and one from the x-ray tube which acts as a non linear resistance.

* * * * *